Jan. 27, 1931.  H. FORD  1,789,971
VEHICLE CONSTRUCTION
Filed Jan. 9, 1929
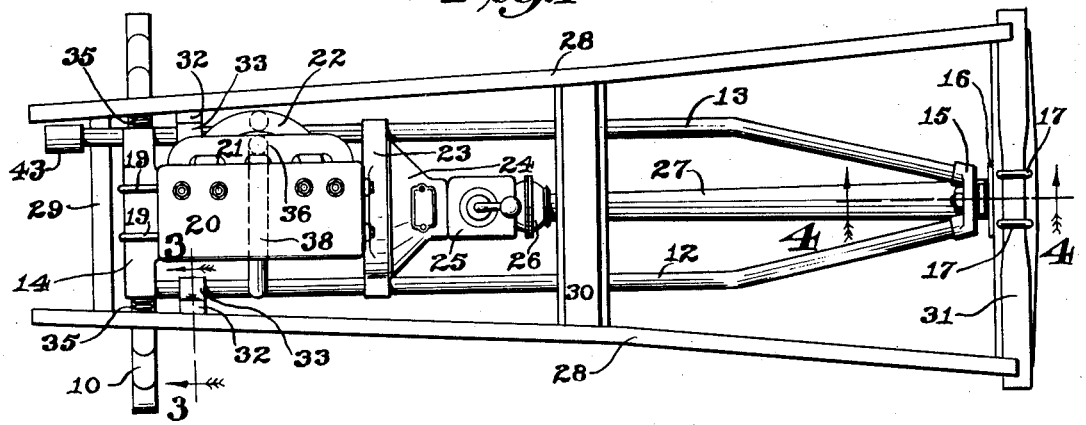
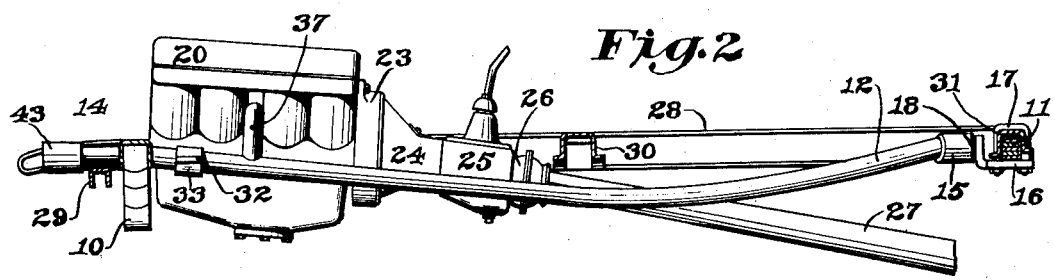
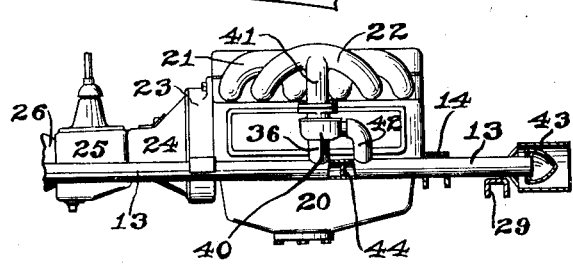
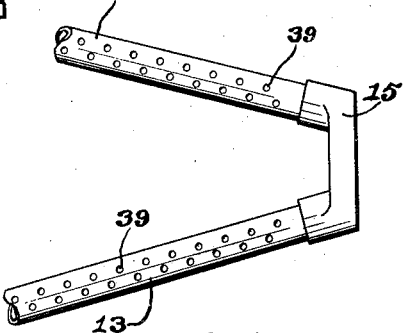
INVENTOR
Henry Ford.
BY C. R. Halbert.
E. L. Davis.
ATTORNEYS.

Patented Jan. 27, 1931

1,789,971

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

VEHICLE CONSTRUCTION

Application filed January 9, 1929. Serial No. 331,300.

The object of my invention is to provide a vehicle construction of simple, durable and inexpensive construction.

Still a further object of my invention is to provide a vehicle that is so constructed that a minimum amount of noise and vibration will be imparted to the body from the engine and running gear.

Still a further object of my invention is to provide an improved means for mounting a body and an engine on the ordinary springs of a vehicle in such a way that the vehicle springs will take the most of the vibration and torque reaction from the engine and but a very small part of this vibration and reaction will be transmitted to the body whereby the presence of the engine may be made as unnoticeable as possible within the body.

Still a further object of my invention is to mount the engine on a cradle or sub-frame which is directly connected to the front spring and connected by a trunnion to the rear spring while the body has an independent frame of its own which is mounted on springs relative to the engine at the front and connected to the rear springs by a rear cross member.

Still a further object of my invention is to mount the engine and body on separate frames in such a way that the front ends of these frames may be permitted yielding universal movement relative to each other and the transmission of engine noises and vibrations to the body may be largely eliminated.

Still a further object of my invention is to provide an engine frame which is constructed from tubes which extend from the rear spring to the front spring and to make this frame independent of the body except for the yielding connection at the front thereof, and to so construct this tubular frame that the exhaust gases and intake air may pass therethrough, the exhaust being carried back by both side frame members and the air being taken in through one of said members.

Still a further object is to arrange the rear ends of these frame members so they may act as a muffler for the exhaust gases.

With these and other objects in view, my invention consists in the arrangement, construction, and combination, of the various parts of my improved device as described in the specification, claimed in the claims, and illustrated in the accompanying drawings, in which Figure 1 shows a top or plan view of the double frame construction of my improved vehicle.

Figure 2 shows a side elevation of the device shown in Figure 1, the body side frame member, the rear cross member of the body frame, and both front frame cross members being broken away to better illustrate the construction.

Figure 3 shows a vertical, sectional, transverse view taken on the line 3—3 of Figure 1.

Figure 4 shows a vertical, longitudinal view taken on the line 4—4 of Figure 1.

Figure 5 shows a bottom view of the rear end of the engine frame, and

Figure 6 shows a side view of the engine to thereby illustrate the construction of the manifold connections.

Referring to the accompanying drawings, I have used the reference numerals 10 and 11 to indicate generally the multiple leaf semi-elliptic springs which are ordinarily used in connection with an automobile. Mounted on these springs by means of two U bolts at the front end and a trunnion at the rear end is an engine frame member having the tubular longérons 12 and 13 and the front and rear cross members 14 and 15. The rear ends of these tubular longérons 12 and 13 converge toward each other so that the rear cross member 15 is relatively short. The rear engine cross frame member 15 is rigidly connected to these longérons in any suitable manner as by welding, riveting or bolts.

An angular bracket 16 is clamped to the rear vehicle spring 11 by a pair of U bolts 17. The vertical web of this bracket 16 has a trunnion 18 rigidly mounted therein in any suitable manner as by riveting or welding, and this trunnion 18 extends through the rear engine cross frame member 15 whereby the latter may be pivoted to swing on a horizontal axis relative to the vehicle spring. The forward or front engine frame cross member 14 is clamped securely to the front vehicle spring 10 by means of the U bolts 19. This engine frame cross member 14 is rigidly secured to the forward ends of the longérons 12 and 13 so that the engine may be mounted on a rigid engine frame which is directly connected to the vehicle springs 10 and 11.

This frame is so mounted that the front vehicle spring will take the torque reactions of the engine and the effect thereof will not be transmitted to the rear end of the vehicle because of the trunnion mounting of the rear frame member 15.

An engine 20 of conventional type is mounted in a conventional manner on the forward end of the engine frame. This engine has an exhaust manifold 21 and an intake manifold 22 at one side thereof. Rearwardly of the engine is the conventional flywheel housing 23, the clutch housing 24, the transmission housing 25, the universal housing 26, and the torque tube 27.

An independent body frame member which is a unit by itself is provided in connection with my improved vehicle construction. This body frame member consists of the two longérons 28 which are connected together by the front, center, and rear frame cross members 29, 30 and 31 respectively. The rear frame cross member 31 is secured or clamped to the rear vehicle spring 11 by the same U bolts 17 which clamp the bracket 16 in place. In other words, the rear end of the body frame member is supported directly on the rear vehicle spring.

The engine frame longérons 12 and 13 each have lugs 32 extended horizontally and laterally therefrom adjacent to their forward ends, these lugs 32 being secured to the longérons in any suitable manner as by means of a collar 33 welded thereto. These lugs 32 extend into the channel of the channel section longérons 28 and are held midway between the top and bottom web of said longérons by pairs of springs 34. It will thus be seen that the forward end of the body frame is mounted for vertical reciprocation relative to the engine frame and that this movement is cushioned or controlled by the springs 34.

A similar pair of springs 35 is extended between the ends of the front engine frame cross member 14 and the adjacent longérons 28 in such position as to yieldingly control lateral movement of the body frame member relative to the engine frame member. In other words, I have provided a yielding universal mounting for the front end of the body frame relative to the front end of the engine frame.

From the foregoing it will be seen that free movement of the forward end of the body frame member is permitted relative to the forward end of the engine frame member whereby engine vibration, torque reaction of the engine, and to some extent road shock, will not be transmitted from the engine frame to the body frame. Experiments for this type of mounting have shown that objectional noise within the body caused by the engine is largely lessened, if not eliminated.

As has heretofore been described, the engine frame longérons 12 and 13 are hollow tubular structures and it is my intention to use both of these longérons to carry away the exhaust gases from the engine and the forward end of one to carry the intake air to the engine. In the form of the device here shown, the exhaust manifold 21 is connected by the riser 36 with the inside of the longéron 13. The longéron 12 is also connected with the exhaust manifold 21 by a riser 37 and a cross pipe 38 which extends in between the two center cylinders of the engine and communicates with the riser 36. The rear ends of these longérons 12 and 13 adjacent to the cross members 15 are provided with a large number of small openings 39 so that the exhaust gas from the engine which passes rearwardly through the longérons may be discharged into the air. These openings are illustrated especially in Figure 5.

The carburetor 40 is connected with the intake manifold 22 by the riser 41. The carburetor is further connected by means of the combined elbow and riser 42 with the forward end of the longéron 13. This member extends forward to position in front of the front body cross frame member 29 at which point an air cleaner 43 is secured thereto. This air cleaner may be of any standard air cleaner construction and its design is not herein more fully described as such cleaners are well known and a number of them are available on the open market.

In order that the intake air in the forward end of the longéron 13 may not mix with the exhaust gas in the rear end thereof, a partition 44 is provided in the longéron 13 between the risers 36 and 42. Any suitable means may be used for forming this partition but in the form of device herein illustrated, I have used a "Welch" plug which is the type of plug which is initially formed of concave shape and then when this concavity is flattened out its diameter is increased so that it may wedge itself into place in the longéron 13.

Many advantages result from the use of my improved vehicle construction, as has been obvious from the description thereof in the specification, that it may be well to enumerate the most important thereof.

The provision of independent frames to carry the engine and the body together with a yielding connection between the forward ends thereof and the trunnion connection between the rear ends thereof insulate the body from the engine to such an extent as to largely eliminate objectionable engine noises or vibration in the body. The tubular construction of the engine frame has the further advantage of making an independent exhaust pipe unnecessary and of lessening the carburetor intake hiss.

Some changes may be made in the construction, arrangement, and combination of my improved device without departing from the spirit of my invention, and it is my intention to cover by my claims such changes as may reasonably be included within the scope thereof.

I claim as my invention:

1. In a vehicle construction, a front and rear vehicle spring, an engine supporting frame clamped to the front spring and pivotally mounted relative to the rear spring, and a body frame clamped to said rear spring and yieldingly mounted upon said front spring.

2. In a body construction, an engine frame, an independent body frame, front and rear springs, means for pivotally connecting the engine frame to the rear spring, means for clamping the body frame to the rear springs, means for clamping the engine frame to the front springs, and a yielding connection between the front end of the body frame and the front spring adapted to yieldingly permit limited universal movement of the front end of the two frames relative to each other.

3. In a vehicle construction, front and rear spring members, an engine frame clamped to said front spring and mounted to rotate relative to the rear spring on the central longitudinal axis of the frame, an independent body frame clamped to said rear spring, coil springs interposed between the front end of said frames adapted to permit limited vertical reciprocation of said frames relative to each other, and other coil springs interposed between the front ends of said frame adapted to permit limited lateral movement of said frames relative to each other.

4. In a vehicle construction, front and rear spring members, an engine frame clamped to said front spring and mounted to rotate relative to the rear spring on the central longitudinal axis of the frame, and an independent body frame having its rear portion clamped to said rear spring and having its forward portion secured to said engine frame by a yielding universal mounting permitting limited lateral and vertical movement of the forward portions of said frames relative to each other.

5. In a vehicle construction, front and rear spring members, an engine frame, a body frame, means for fixedly mounting the rear portions of both of said frames on the rear spring, means for fixedly mounting the forward portion of the engine frame on the front spring, and means permitting yielding universal movement for mounting the forward end of the body frame on the engine frame.

December 19, 1928.

HENRY FORD.